US009535977B1

(12) United States Patent
Joyce et al.

(10) Patent No.: US 9,535,977 B1
(45) Date of Patent: Jan. 3, 2017

(54) OBJECT BUILDING FOR AN AGGREGATE OBJECT CLASS REQUEST (75) Inventors: Scott E. Joyce, Foxboro, MA (US); Norman M. Miles, Bedford, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 50 days.

(21) Appl. No.: 13/076,925

(22) Filed: Mar. 31, 2011

(51) Int. Cl.
G06F 17/30 (2006.01)

(52) U.S. Cl.
CPC .............. G06F 17/30607 (2013.01)

(58) Field of Classification Search
CPC .......... G06F 17/30545; G06F 17/30557; G06F 9/4428; G06F 17/30607; G06F 17/30011; G06F 17/30958; G06F 17/30994; G06F 2206/1008; H04L 41/0233
USPC .......................... 707/769; 717/116
See application file for complete search history.

(56) References Cited

U.S. PATENT DOCUMENTS

| 6,944,829 | B2 | 9/2005 | Dando |
| 7,120,646 | B2 | 10/2006 | Streepy, Jr. |
| 7,293,237 | B1 | 11/2007 | Knight et al. |
| 7,532,340 | B2 | 5/2009 | Koppich et al. |
| 2007/0266369 | A1* | 11/2007 | Guan et al. .................. 717/116 |

* cited by examiner

Primary Examiner — Ann J Lo
(74) Attorney, Agent, or Firm — BainwoodHuang (57) ABSTRACT A client device of a data storage system is configured to generate an aggregate object class request, or view class request, that relates to multiple objects stored by an object storage device. The aggregate object class request represents a view of the object model stored by the object storage device in a format that is specific to the perspective of the client device. In response to receiving the aggregate property file, such as from the client device, the object storage device accesses the property files associated with each of the metadata tags, retrieves the corresponding object data, and identifies the object data to the client device. With such a configuration, use of the aggregate object class request allows the client device to receive object data associated with multiple object classes with a single request or call to the object storage device.

19 Claims, 4 Drawing Sheets

OBJECT BUILDING FOR AN AGGREGATE OBJECT CLASS REQUEST

BACKGROUND

Certain conventional data storage systems use the Common Information Model (CIM) to represent elements of a data storage system (e.g., disks, LUNs, RAID groups, subsystems, etc.). These data storage systems are managed remotely by a conventional client application running on a client computer device across a network. In order for the client device to obtain information regarding certain aspects of the data storage system, the client device issues a request for certain CIM objects maintained by the data storage system (i.e., CIM objects of a particular type).

Conventional data storage systems typically include a server device configured to, in part, store an object data model having a set of hierarchically arranged object classes. Each object class has an associated property file which characterizes instances of a CIM object class within the hierarchy. For example, conventional client side computer devices store client side property files that map to a hierarchical object data model. These can include property files for CIM classes of objects representing disks, storage processors, RAID groups, and enclosures associated with the data storage system.

In these conventional data storage systems, in response to receiving the requested CIM objects, the client device can display the CIM objects in several different ways. For example, the client device can display each of the objects as a particular component (e.g., as a button, a link, or a table) of a class of objects, thereby allowing an end user to interact with a data storage system element (e.g., disk, logical unit number or LUN, host, etc.) represented by the corresponding displayed objects.

SUMMARY

In conventional data storage systems, when requesting CIM object data, the client device transmits an object request to the server device. In order to retrieve multiple CIM objects for two or more classes of objects, in conventional data storage systems, the client device transmits two or more separate object requests to the server device. However, the generation and transmission of multiple object requests can be time consuming to the client device and can delay the client device from displaying the CIM objects. Additionally, the response to the multiple object requests can include duplicate objects from the server device.

By contrast to the above-described approaches, embodiments of the present invention relate to object building for an aggregate object class request. A client device of a data storage system is configured to generate an aggregate object class request, or view class request, that relates to multiple objects stored by an object storage device. The aggregate object class request represents a view of the object model stored by the object storage device in a format that is specific to the perspective of the client device. For example, the aggregate object class request directs the object storage device to access an aggregate property file which is configured as a property file that includes metadata tags to denote the multiple objects requested by the client device. In response to receiving the aggregate property file, such as from the client device, the object storage device accesses the property files stored on the client device and associated with each of the metadata tags, retrieves the corresponding object data, and identifies the object data to the client device. With such a configuration, use of the aggregate object class request allows the client device to receive object data associated with multiple object classes with a single request or call to the object storage device. The generation and transmission of a single aggregate object class request for multiple object classes can minimize the amount of processing time required by the client device and minimize delays in displaying the CIM objects.

Certain embodiments of the invention relate to a method for providing an object to a client device. The method includes receiving, by an object storage device, an aggregate object class request from the client device, the aggregate object class request requesting object data associated with at least two distinct object classes of an object data model associated with the object storage device. The method includes accessing, by the object storage device, the property files associated with the at least two distinct object classes. The method includes retrieving, by the object storage device and from the property files associated with the at least two distinct object classes, object data associated with the aggregate object class request. The method includes identifying, by the object storage device, the object data to the client device in response to the aggregate object class request.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention relate to object building for an aggregate object class request. A client device of a data storage system is configured to generate an aggregate object class request, or view class request, that relates to multiple objects stored by an object storage device. The aggregate object class request represents a view of the object model stored by the object storage device in a format that is specific to the perspective of the client device. For example, the aggregate object class request directs the object storage device to access an aggregate property file which is configured as a property file that includes metadata tags to denote the multiple objects requested by the client device. In response to receiving the aggregate property file, such as from the client device, the object storage device accesses the property files stored on the client device and associated with each of the metadata tags, retrieves the corresponding object data, and identifies the object data to the client device. With such a configuration, use of the aggregate object class request allows the client device to receive object data associated with multiple object classes with a single request or call to the object storage device. The generation and transmission of a single aggregate object class request for multiple object classes can minimize the amount of processing time required by the client device and minimize delays in displaying the CIM objects.

Figure 1:
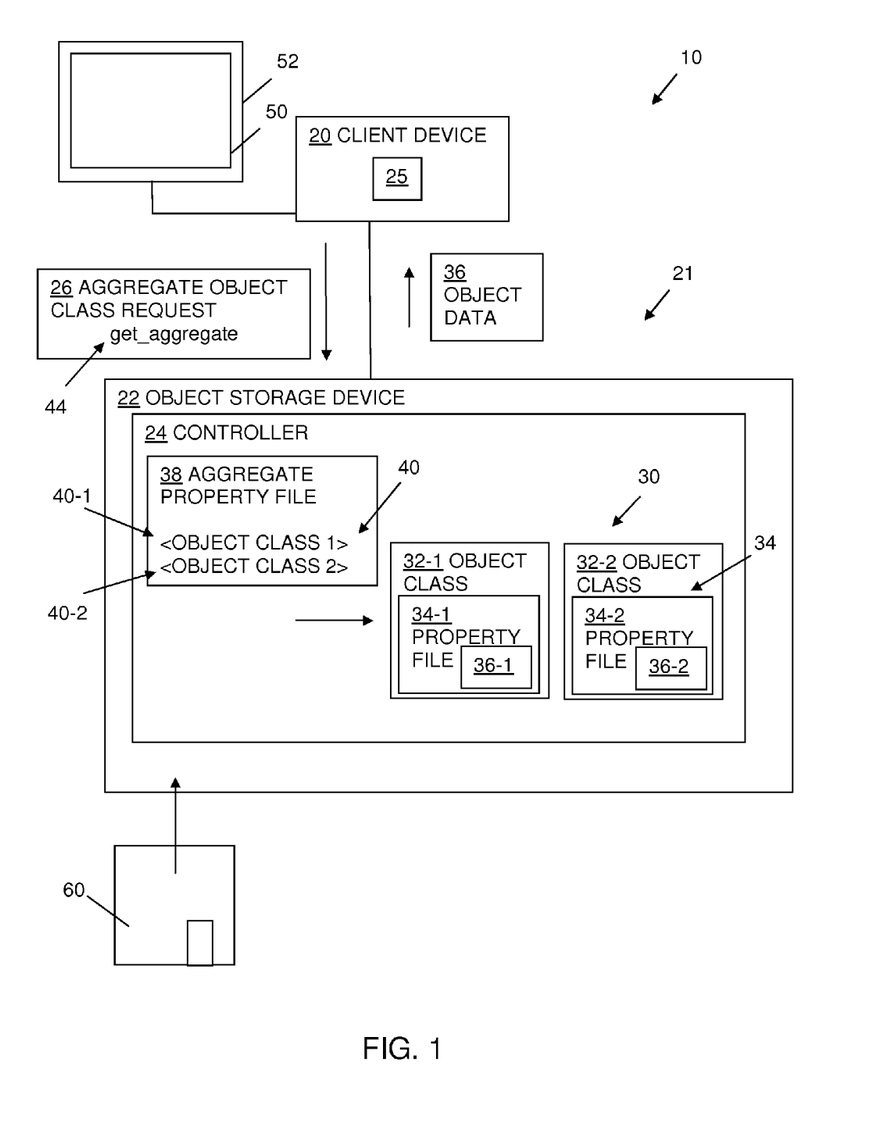
FIG. 1 illustrates a schematic representation of a data storage system having an object storage device, according to one embodiment.

FIG. 1 illustrates an example arrangement of a data storage environment 10, such as used by an enterprise. As shown, the data storage environment 10 includes a client device 20 disposed in electrical communication with a data storage system 21 via a network connection.

The client device 20, such as a computerized device, includes a controller 25, such as a memory and a processor. The controller 25 of the client device 20 is configured to generate an aggregate object request 26 and transmit the aggregate object request 26 to the object storage device 22. In one arrangement, the aggregate object request 26 is configured as an object having one or more associated object calls 44. For example, as will be described in detail below, the aggregate object request includes a get_aggregate object call 44 which causes the object storage device 22 to access a corresponding aggregate property file 38. In response to receiving object data 36 from the object storage device 22, the client device 20 is configured to build one or more objects using particular methods or calls (e.g., get name, get icon, get tooltip) and visually output the objects as part of a graphical user interface (GUI) 50 presented on an associated display 52.

In one arrangement, the data storage system 21 is configured as an object storage device 22 having a set of disk enclosures where each of the disk enclosures includes an array of magnetic memory units or disk drives (not shown). The object storage device 22 also includes one or more storage processors (not shown) configured to perform load and store operations on the disk drives on behalf of the client device 20.

The object storage device 22 includes a controller 24, such as a memory and a processor, and is configured to store an object data model 30 having a plurality of objects or object classes 32. An object is a representation of a logical or a physical location of data in the object storage device 22. Any object in the object storage device 24 may be categorized into a CIM class which relates to the type of element that any given object represents. CIM classes of objects can include subsystem, host, folder, logical unit number (LUN), disks, fans, link control cards (LCCs), power supply, storage processor, RAID group, and storage group classes, for example.

The object storage device 22, in one arrangement, stores the object data model 30 as a hierarchically arranged structure. For example, with reference to FIG. 3, the object data model 30 includes a set of object classes 32. In the case where the object data model 30 relates to data storage management, the set of object classes 32 can include a storage object class 32-4, a disk object class 32-1, a Redundant Array of Independent Disks (RAID) object class 32-5, an enclosure object class 32-2, a storage processor object class 32-6, a disk processor enclosure (DPE) object class 32-8, and a disk array enclosure (DAE) object class 32-9. Because various properties may be shared between the various object classes 32, the object data model 30 is hierarchically arranged such that certain object classes are configured as subclasses which inherit certain properties from hierarchically arranged super classes to which the object classes belong. In such an arrangement, the client device is not required to store certain properties multiple times. For example, the disk object class 32-1, RAID object class 32-5, enclosure object class 32-2, and a storage processor object class 32-6 are all subclasses of the storage object class 32-4 and, as a result, can inherit certain properties from the storage object class 32-4.

Certain object classes 32 in the object data model 30 stored by the object storage device 22 have associated property files 34 as stored by the client device 20. For example, with continued reference to FIG. 3, the storage object class 32-4 has an associated storage object property file 34-4, the disk object class 32-1 has an associated disk object property file 34-1, the RAID object class 32-5 has an associated RAID object property file 34-5, and the enclosure object class 32-2 has an associated enclosure object property file 34-2. Each property file includes information, such as a set of name-value pairs that characterize an instance of that object class. For example, the property file 34-5 for the RAID object class can include the name-value pair RAIDGroupID=Raid Group 1 to identify a RAID group associated with the property file 34-5 and the name-value pair RGFreeSpace=Free Capacity to identify an amount of available space on the RAID group associated with the property file 34-5.

In one arrangement, the controller 24 of the object storage device 22 stores a property file accessing application. The property file accessing application installs on the object storage device 22 from a computer program product 60. In some arrangements, the computer program product 60 is available in a standard off-the-shelf form such as a shrink wrap package (e.g., CD-ROMs, diskettes, tapes, etc.). In other arrangements, the computer program product 60 is available in a different form, such downloadable online media. When performed on the controller 24 of the object storage device 22, the property file accessing application causes the object storage device 22 to access property files 34 associated with the at least two distinct object classes 32 and retrieve object data from the distinct object classes 32 in response to receiving an aggregate object class request from the client device 20.

Figure 2:
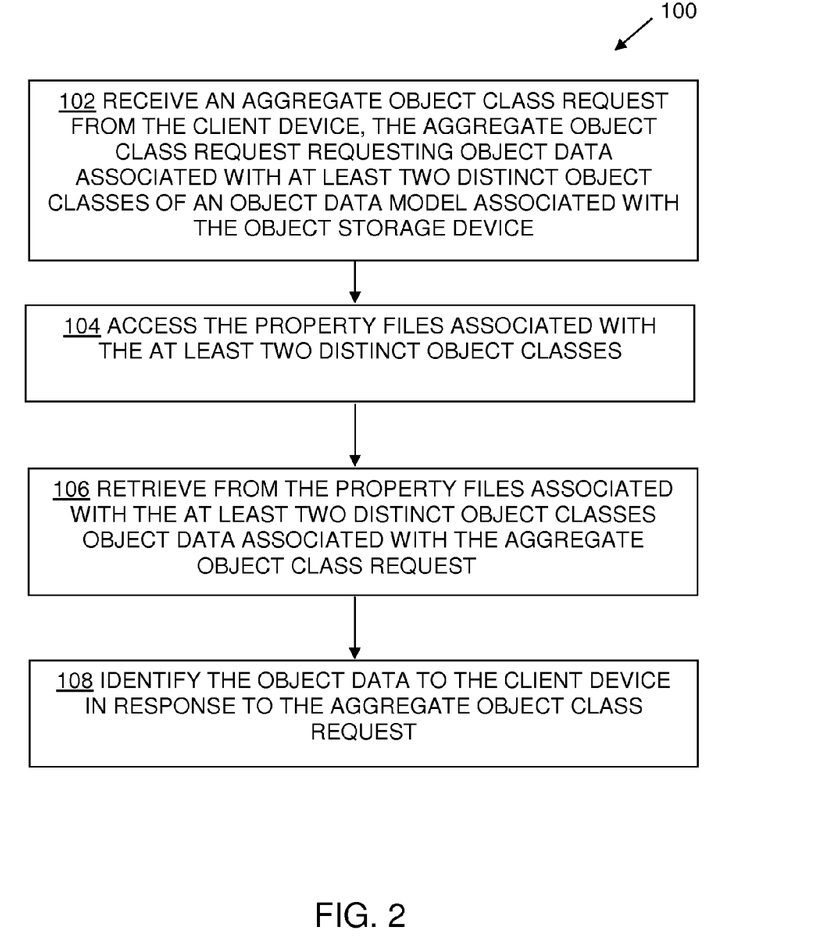
FIG. 2 is a flowchart that illustrates a procedure performed by the object storage device of FIG. 1, according to one embodiment.

FIG. 2 is a flowchart 100 that illustrates a procedure performed by the object storage device 22 of FIG. 1 for providing an object to a client device 20.

Figure 3:
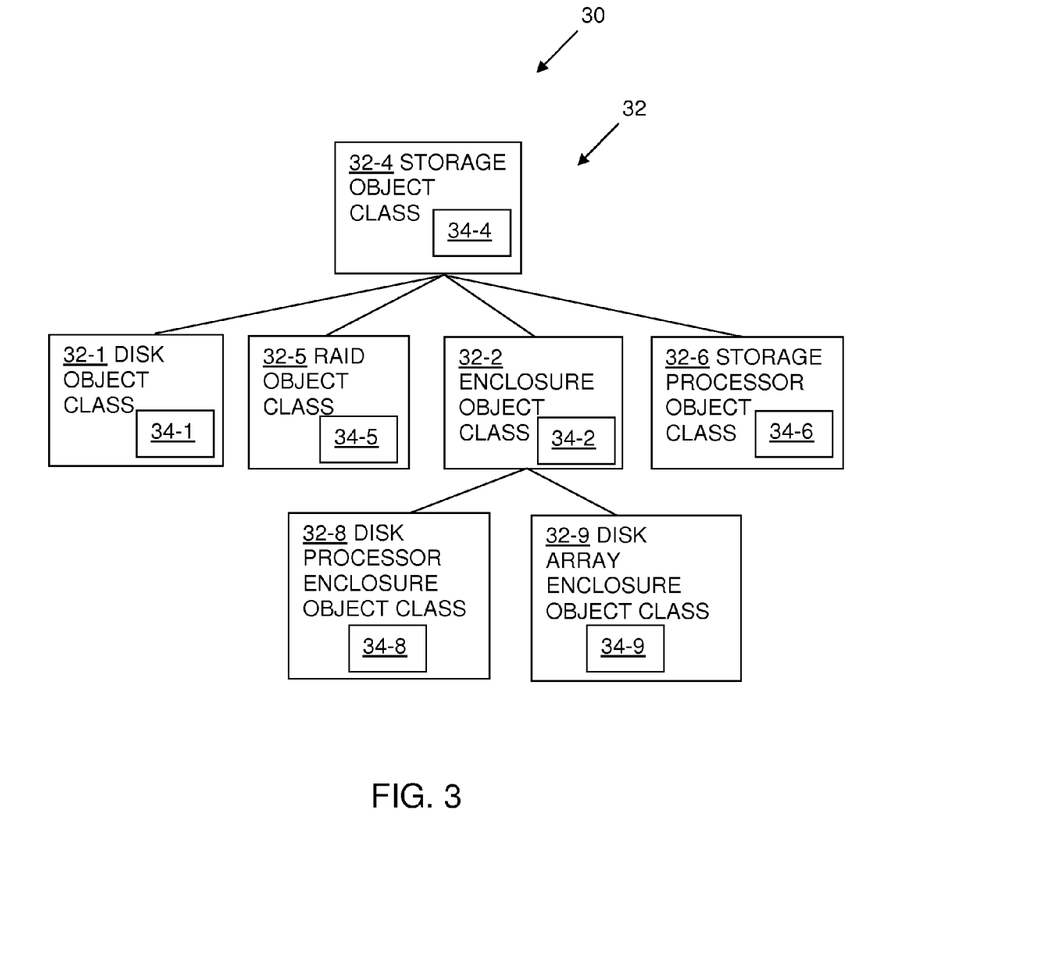
FIG. 3 illustrates an example of a hierarchical arrangement of object classes of an object data model stored by the object storage device.

In step 102, the object storage device 22 receives an aggregate object class request 26 from the client device 20, the aggregate object class request 26 requesting object data 36 associated with at least two distinct object classes 32 of an object data model 30 associated with the object storage device 22. For example, assume a user of the client device 20 wants to display information relating to all disks in the enclosures of the data storage environment. With reference to FIG. 3, a request for such information relates to two separate and distinct object classes 32, namely the disk object class 32-1 and the enclosure object class 32-2. As illustrated, the disk and enclosure object classes 32-1, 32-2 are non-hierarchically arranged relative to each other. In such an arrangement, both the disk and enclosure object classes 32-1, 32-2 are configured as subclasses which inherit certain properties from the hierarchically arranged storage object 32-4 super class but are not subclasses of each other. Accordingly, as indicated in FIG. 1, the object storage device 22 receives the request as an aggregate object class request 26 that requests object data related to both the disk and enclosure object classes 32-1, 32-2. While the aggregate object class request 26 can be configured in a variety of ways, in one arrangement, the aggregate object class request 26 is configured as an object having one or more associated object calls 44 such as a get_aggregate object call.

Returning to FIG. 2, in step 104, the object storage device 22 accesses the property files 34 associated with the at least two distinct object classes 32. As indicated above, each object class 32 of the object data model 30 includes a corresponding property file 34. While the object storage device 22 can access the property files 34 stored on the client device 20 for multiple object classes 32 in a variety of ways, in one arrangement, and with reference to FIG. 1, the object storage device 22 accesses the property files 34 via an aggregate property file 38.

The aggregate property file 38 defines a mapping with at least two object class property files 34 associated with the requested object classes 32 of the object data model 30. In one arrangement, the object storage device 22 can define a variety of aggregate property files 38 which map to various combinations of object classes 32. For example, the aggregate property file 38 illustrated in FIG. 1 maps to both a first object class, namely the disk object class 32-1, and a second object class, namely an enclosure object class 32-2. In one arrangement, the aggregate property file 38 includes a set of metadata 40 which maps the aggregate property file 38 to corresponding object classes 32. For example, the aggregate property file 38 includes a first metadata entry 40-1 which maps the aggregate property file 38 to the first object class (i.e., the disk object class) 32-1 and a second metadata entry 40-2 which maps the aggregate property file 38 to the second object class (i.e., the disk object class) 32-2.

Accordingly, in use, once the object storage device 22 receives the aggregate object request 26, the object storage device 22 executes the get_aggregate object call 44 to receive the aggregate property file 38 associated with the aggregate object request 26. In this particular case, because the aggregate object request 26 requests object data related to both the disk and enclosure object classes 32-1, 32-2, execution of the get_aggregate object call 44 causes the object storage device 22 to retrieve the aggregate property file 38 associated with both disk and enclosure object classes 32-1, 32-2 from the client device 20. After having selected the appropriate aggregate property file 38, the object storage device 22 identifies particular object classes 32 associated with the initial aggregate object request 26 by reviewing the metadata entries 40 contained in the aggregate property file 38. For example, based upon the metadata entries 40-1, 40-2, the object storage device 22 accesses the corresponding disk and enclosure object classes 32-1, 32-2, as well as the corresponding property files 34-1, 34-2.

Returning to FIG. 2, in step 106, the object storage device 22 retrieves from the property files 34 associated with the at least two distinct object classes 32 object data 36 associated with the aggregate object class request 26. As indicated above, a property file 34 for an object class 32 includes information, such as a set of name-value pairs that characterize an instance of that object class 32. Accordingly, based upon the metadata entries 40-1, 40-2, the object storage device 22 retrieves the disk object data 36-1 from the disk object property file 34-1 associated with the disk object class 32-1 and retrieves the enclosure object data 36-2 from the enclosure object property file 34-2 associated with the enclosure object class 32-2.

As indicated above, in one arrangement, certain class objects of the object data model 30 are configured as subclasses which inherit certain property definitions from hierarchically arranged super classes. For example, with reference to FIG. 3, both the disk object class 32-1 and the enclosure object class 32-2 can inherit property definitions from the storage object class 32-4 to minimize duplication of the property definitions within the object data model 30.

Thus, for example, the property definition "Name=Name" can appear in the properties file associated with the storage object class 32-4, there by alleviating the need for that property definition to be includes in each object class, such as the disk and enclosure object classes 32-1, 32-2, which inherit this property definition from the from storage object class 32-4.

Based upon this arrangement, in certain cases, the object storage device 22 is configured to hierarchically traverse the object data model 30 when retrieving the object data 36 from the associated property files 34 of the requested object classes. For example, assume the object storage device 22 reads the property file 36-1 for the disk object class 32-1 and fails to find a particular property, such as a Name property, within the property file 36-1. Because the disk object class 32-1 inherits property definitions from the storage object class 32-4, the object storage device 22 can traverse up the object hierarchy 82 of the object data model 30 to detect the Name property associated with the disk object class 32-1. For example, the object storage device 22 next examines the properties file 34-4 for the hierarchically arranged super class, namely the storage object class 32-4, to detect the Name property associated with the disk object class 32-1. In this case, because the Name property is defined in the properties file 34-4 for the storage object class 304, the object storage device 22 stops its hierarchical traversal of the object data mode 30 and detects the value of the Name property for the disk object class 32-2 from the storage object class 32-4.

Returning to FIG. 2, in step 108, the object storage device 22 identifies the object data 36 to the client device 20 in response to the aggregate object class request 26. For example, with reference to FIG. 1, once the object storage device 22 has retrieved the object data 36-1, 36-2 from the property files 34-1, 34-2 associated with the disk and enclosure object classes 32-1, 32-2, the object storage device 22 identifies the object data 36-1, 36-2 to the client device 20. In one arrangement, the object data 36 is configured as one or more property files. The client device 20 utilizes the object data 36 build one or more objects using particular methods or calls (e.g., get name, get icon, get tooltip) and visually output the objects as part of the graphical user interface 50 presented on the display 52.

Accordingly, use of the aggregate object class request 26 allows the client device 20 to receive object data 36 associated with multiple object classes 32 with a single request or call 26 to the object storage device 22. The generation and transmission of a single aggregate object class request 26 for multiple object classes 32 can minimize the amount of processing time required by the client device 20 and minimize delays in displaying the CIM objects. Additionally, the use of the single aggregate object class request 26 minimizes involvement of the end user of the client device 20 in generating the objects, as the end user can be unaware that the name-value pairs within the received property file come from a number of different sources.

While various embodiments of the invention have been particularly shown and described, it will be understood by those skilled in the art that various changes in form and details may be made therein without departing from the spirit and scope of the invention as defined by the appended claims.

As indicated above, each object class 32 includes a corresponding property file 34 which includes a set of name-value pairs that characterize an instance of that object class 32. In one arrangement, each property file also includes localization information identifying the object class 32 as being associated with a certain locale. By utilizing the localization information, the client device 20 can display CIM object information associated with requested object classes 32 according to local protocols or languages.

Figure 4:
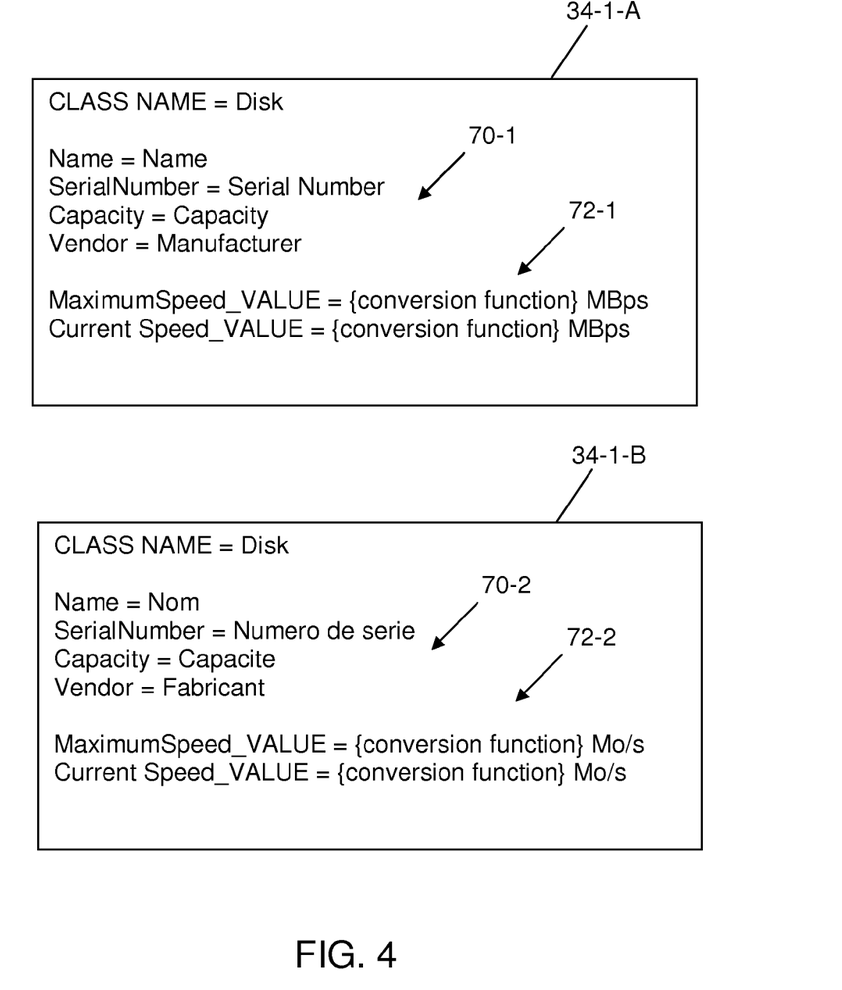
FIG. 4 illustrates examples of property files, according to one embodiment.

For example, FIG. 4 depicts two example properties files 34-1-A and 34-1-B corresponding to the disk object class 32-1. The first property file 34-1-A is configured with English localization information while the second property file 34-1-B is configured with French localization information. For example, the first property file 34-1-A includes localized description values 70-1 identifying description indicators for display in English while the second property file 34-1-B includes localized description values 70-2 identifying description indicators for display in French. Additionally, the first property file 34-1-A includes localized numeric property values 72-1 identifying numeric display indicators (e.g., the unit of measure MBps) for display in English while the second property file 34-1-B includes localized numeric property values 72-2 identifying numeric display indicators (e.g., the unit of measure megaoctet per second or Mo/s) for display in French. Accordingly, in such an arrangement, when the object storage device 22 retrieves object data 36 for a particular object class 32, the object storage device 22 can retrieve localization information, such as localized description values 70 and localized numeric property value 72, from the property files 34 that correspond to the local of the client device 20. When converting numerical values of the object data 36 into localized values, the object storage device 22 can execute the process described in the U.S. patent application entitled "A Method to Simplify Developing Software Having Localization Features," Ser. No. 12/238,926, the contents of which is incorporated by reference in its entirety.

As indicated above, the object storage device is configured to receive an aggregate property file from the client device where the aggregate property file includes metadata tags to denote the multiple objects requested by the client device. In response, the object storage device accesses the property files associated with each of the metadata tags, retrieves the corresponding object data, and identifies the object data to the client device. Such description is by way of example only. In one arrangement, the object storage device retrieves the aggregate property file from an object storage device side memory location, rather than from the client device.

What is claimed is:

1. A method for providing an object to a client device, comprising:
   receiving, by an object storage device, an aggregate object class request from the client device, the aggregate object class request requesting object data associated with at least two distinct and unrelated object classes of an object data model associated with the object storage device;
   accessing, by the object storage device, property files associated with the at least two distinct and unrelated object classes;
   retrieving, by the object storage device and from the property files associated with the at least two distinct and unrelated object classes, object data associated with the aggregate object class request;
   wherein retrieving from the property files associated with the at least two distinct and unrelated object classes, object data associated with the aggregate object class request includes providing hierarchically arranged object classes, the hierarchically arranged object classes representing data storage management object classes, the data storage management object classes being at least one of a disk object class, a RAID object class, an enclosure object class, and a storage processor object class; and
   identifying, by the object storage device, the object data to the client device in response to the aggregate object class request; wherein:
   in response to receiving the aggregate object class request from the client device, receiving, by the object storage device, an aggregate property file associated with the aggregate object class request, the aggregate property file defining a mapping with at least two object class property files associated with the at least two distinct and unrelated object classes of the object data model; and
   accessing the property files associated with the at least two distinct and unrelated object classes comprises accessing, by the object storage device, the at least two property files mapped by the aggregate property file,
   wherein the at least two distinct object classes include a requested object class,
   wherein the object data model is arranged hierarchically, with the requested object class inheriting properties from a super class disposed above the requested object class in the object data model, and
   wherein retrieving the object data includes hierarchically traversing the object data model by (i) searching a first property file associated with the requested object class for a particular property of the requested object class, (ii) in response to the first property file not including the particular property, searching a second property file associated with the super class, the requested class inheriting the particular property from the super class, and (iii) obtaining the particular property from the second property file.

2. The method of claim 1, wherein the aggregate property file includes a set of metadata, each metadata entry of the set of metadata mapping the aggregate property file to a corresponding one of the at least two property files.

3. The method of claim 1, wherein the aggregate object class request is configured as an object and wherein retrieving the aggregate property file associated with the aggregate object class request comprises executing, by the object storage device, object calls associated with the aggregate object class request to retrieve the aggregate property file associated with the aggregate object class request.

4. The method of claim 1, wherein retrieving object data associated with the aggregate object class request comprises hierarchically traversing, by the object storage device, the object data model associated with the object storage device to retrieve object data associated with the aggregate object class, the object data model associated with the object storage device being hierarchically arranged.

5. The method of claim 1, wherein receiving the aggregate object class request from the client device, the aggregate object class request requesting object data associated with the at least two distinct and unrelated object classes of the object data model associated with the object storage device comprises receiving, by an object storage device, the aggregate object class request from the client device, the aggregate object class request requesting object data associated with at least two distinct non-hierarchically arranged object classes of a hierarchically arranged object data model associated with the object storage device.

6. The method of claim 1, wherein retrieving object data associated with the aggregate object class request comprises retrieving, by the object storage device and from the property files associated with the at least two distinct and unrelated object classes, localization information identifying the object class as being associated with a certain locale.

7. The method of claim 6, wherein retrieving localization information identifying the object class as being associated with a certain locale comprises retrieving, by the object storage device and from the property files associated with the at least two distinct and unrelated object classes, a localized numeric property value identifying a localized numeric property for display.

8. The method of claim 6, wherein retrieving localization information identifying the object class as being associated with a certain locale comprises retrieving, by the object storage device and from the property files associated with the at least two distinct and unrelated object classes, a localized description value identifying a localized description for display.

9. An object storage device, comprising:
a communications interface; and
a controller disposed in electrical communication with the communications interface, the controller configured to:
receive an aggregate object class request from the client device, the aggregate object class request requesting object data associated with at least two distinct and unrelated object classes of an object data model associated with the object storage device;
access property files associated with the at least two distinct object classes;
retrieve from the property files associated with the at least two distinct and unrelated object classes object data associated with the aggregate object class request, wherein the controller, when retrieving the object data, is configured to provide hierarchically arranged object classes, the hierarchically arranged object classes representing data storage management object classes, the data storage management object classes being at least one of a disk object class, a RAID object class, an enclosure object class, and a storage processor object class; and
identify the object data to the client device in response to the aggregate object class request; wherein:
in response to receiving the aggregate object class request from the client device, the controller is configured to receive an aggregate property file associated with the aggregate object class request, the aggregate property file defining a mapping with at least two object class property files associated with the at least two distinct object classes of the object data model; and
when accessing the property files associated with the at least two distinct and unrelated object classes, the controller is configured to access the at least two property files mapped by the aggregate property file,
wherein the at least two distinct object classes include a requested object class,
wherein the object data model is arranged hierarchically, with the requested object class inheriting properties from a super class disposed above the requested object class in the object data model, and
wherein, when configured to retrieve the object data, the controller is further configured to hierarchically traverse the object data model by (i) searching a first property file associated with the requested object class for a particular property of the requested object class, (ii) in response to the first property file not including the particular property, searching a second property file associated with the super class, the requested class inheriting the particular property from the super class, and (iii) obtaining the particular property from the second property file.

10. The object storage device of claim 9, wherein the aggregate property file includes a set of metadata, each metadata entry of the set of metadata mapping the aggregate property file to a corresponding one of the at least two property files.

11. The object storage device of claim 9, wherein the aggregate object class request is configured as an object and when retrieving the aggregate property file associated with the aggregate object class request, the controller is configured to execute object calls associated with the aggregate object class request to retrieve the aggregate property file associated with the aggregate object class request.

12. The object storage device of claim 9, wherein when retrieving object data associated with the aggregate object class request, the controller is configured to hierarchically traverse the object data model associated with the object storage device to retrieve object data associated with the aggregate object class, the object data model associated with the object storage device being hierarchically arranged.

13. The object storage device of claim 9, wherein when receiving the aggregate object class request from the client device, the aggregate object class request requesting object data associated with the at least two distinct and unrelated object classes of the object data model associated with the object storage device, the controller is configured to receive, the aggregate object class request from the client device, the aggregate object class request requesting object data associated with at least two distinct non-hierarchically arranged object classes of a hierarchically arranged object data model associated with the object storage device.

14. The object storage device of claim 9, wherein when retrieving object data associated with the aggregate object class request, the controller is configured to retrieve from the property files associated with the at least two distinct and unrelated object classes localization information identifying the object class as being associated with a certain locale.

15. The object storage device of claim 14, wherein when retrieving localization information identifying the object as being associated with a certain locale the controller is configured to retrieve from the property files associated with the at least two distinct and unrelated object classes a localized numeric property value identifying a localized numeric property for display.

16. The object storage device of claim 14, wherein when retrieving localization information identifying at least a portion of the object as being associated with a certain locale, the controller is configured to retrieve from the property files associated with the at least two distinct and unrelated object classes a localized description value identifying a localized description for display.

17. The method of claim 1, wherein a first data storage management object class of the at least two distinct and unrelated object classes represents a separate data storage management device than a second data storage management object.

18. The method of claim 1, wherein multiple property files are provided for the requested object class, each of the multiple property files providing description indicators in a respective language, and wherein accessing, by the object storage device, a property file for the requested object class includes selecting, based on a locale of the client device, the first property file from among the multiple property files for the requested object class, the first property file thus including description indicators specific to the locale of the client device.

19. The method of claim 1, wherein multiple property files are provided for the requested object class, each of the multiple property files providing localized numeric property values specific to a respective locale, and wherein accessing, by the object storage device, a property file for the requested object class includes selecting, based on a locale of the client device, the first property file from among the multiple property files for the requested object class, the first property file thus including localized numeric property values specific to the locale of the client device.

\* \* \* \* \*